United States Patent [19]

Nguyen et al.

[11] Patent Number: 6,070,067
[45] Date of Patent: May 30, 2000

[54] PREPAYMENT METHOD UTILIZING CREDIT INFORMATION STORED IN MOBILE TERMINALS FOR ACCESSING WIRELESS TELECOMMUNICATION NETWORKS

[75] Inventors: Vu Nguyen, Bromma; Ulises Olvera-Hernández, Djursholm, both of Sweden

[73] Assignee: Telefonaktiebolaget LM Ericsson, Stockholm, Sweden

[21] Appl. No.: 08/961,947

[22] Filed: Oct. 31, 1997

[51] Int. Cl.[7] .................................................. H04M 11/00
[52] U.S. Cl. ........................ 455/407; 455/408; 455/405; 455/435
[58] Field of Search .......................... 379/144; 455/405, 455/406, 407, 408, 432, 433, 435

[56] References Cited

U.S. PATENT DOCUMENTS

| | | | |
|---|---|---|---|
| 4,641,304 | 2/1987 | Raychaudhuri | 370/95 |
| 4,688,213 | 8/1987 | Raychaudhuri | 370/93 |
| 4,776,000 | 10/1988 | Parienti | 455/407 |
| 5,109,401 | 4/1992 | Hattori et al. | 455/407 |
| 5,138,650 | 8/1992 | Stahl et al. | 379/61 |
| 5,148,472 | 9/1992 | Freese et al. | 455/408 |
| 5,303,297 | 4/1994 | Hillis | 455/406 |
| 5,321,735 | 6/1994 | Breeden et al. | 455/406 |
| 5,450,477 | 9/1995 | Amerant et al. | 379/144 |
| 5,479,481 | 12/1995 | Koivunen | 455/433 |
| 5,684,861 | 11/1997 | Lewis et al. | 455/405 |
| 5,749,052 | 5/1998 | Hidem et al. | 455/406 |
| 5,812,945 | 9/1998 | Hansen et al. | 455/407 |

FOREIGN PATENT DOCUMENTS

| | | |
|---|---|---|
| 2265522 | 9/1993 | United Kingdom . |
| 2308528 | 6/1997 | United Kingdom . |
| WO95/28062 | 10/1995 | WIPO . |

OTHER PUBLICATIONS

European Standard Search Report re RS 100617 Date of completion of search: Aug. 31, 1998.

M. Klocke, "*Schweizer Telecom PTT Lanciert Die Welt–Neuheit Natel Sicap*" NTZ Nachrichtentechinsche Zeitschrift, vol. 48, No. 10, p. 44 (Oct. 1, 1995).

*Primary Examiner*—Daniel S. Hunter
*Assistant Examiner*—Thuan T. Nguyen
*Attorney, Agent, or Firm*—Burns, Doane, Swecker & Mathis, L.L.P.

[57] ABSTRACT

A method of providing prepaid access to wireless telecommunication networks by utilizing a mechanism to store subscriber credit information within a mobile terminal is disclosed. The method is especially suitable for subscribers that roam into visiting networks that have the capability of accessing the credit information. In an embodiment of the invention, the method includes transmitting the previously stored subscriber credit information from the mobile terminal to a network's prepayment node during registration. The subscriber credit information, which may include a prepaid credit balance in dollars, is transmitted via the Over-the-Air-Teleservice (OATS) function as specified in the IS-136 standard. When a call is placed, the cost of the call, based on the current tariff rate, is calculated by the prepayment node and deducted from the initially received credit balance to determine an updated credit balance. The updated credit balance is transmitted via OATS to the mobile terminal for storage therein. The updated credit balance then becomes available to be retrieved by any compatible network that has the capability of utilizing the credit information.

15 Claims, 2 Drawing Sheets

PREPAYMENT METHOD UTILIZING CREDIT INFORMATION STORED IN MOBILE TERMINALS FOR ACCESSING WIRELESS TELECOMMUNICATION NETWORKS

FIELD OF THE INVENTION

The present invention relates generally to prepayment methods for accessing wireless telecommunication networks. More specifically, the invention relates to a prepayment method that enables subscriber credit information to be easily accessible by a plurality of compatible wireless networks thereby permitting prepaid roaming.

BACKGROUND OF THE INVENTION

The tremendous growth in demand for wireless telecommunication services in recent years has cultivated an environment where service providers can afford to select those customers that satisfy stringent credit requirements and deemed to be the lowest risk from the prospective of the provider. A natural byproduct of this situation is that many customers are rejected on the basis of their credit histories and are therefore denied service. This large market of potential customers has been keenly courted by the wireless industry through the concept of having subscribers prepay prior to services rendered to them. Prepayment, as it seems, satisfies all parties involved: allaying the concerns of the industry regarding due payment for services rendered and customers are able to obtain service that they would otherwise not be able to. Other reasons that prepaid access may be attractive include the ability for customers to limit usage i.e. control bills and the fact that many providers require long term commitments which may not suit customers desiring more short term or transient programs.

Not surprisingly, prepayment systems have been increasingly popular among service providers with many expeditiously being put into operation to obtain the additional revenue generated from more subscribers. Many of these prior art prepayment systems are self-contained units that are coupled to the mobile switching center (MSC) of the wireless network. In a typical prepayment procedure, customers are required to purchase a prepaid card containing credit that entitles them to a limited amount of calling time. The prepaid cards purchased by customers may be of a disposable variety i.e. only used once or may be reused by paying to replenish the credit stored therein.

A major disadvantage of the prior art prepayment methods as described is that the prepayment systems only work with the network it is attached to and thus does not permit subscribers to roam to other networks. A further complication is that various networks may be employing incompatible prepayment systems that do not support the prepaid subscribers of other networks. At present there exists no prevailing standard for communication between the various prepayment systems in use by different networks. A further disadvantage with the prior art method is that the subscriber is required to go out and purchase a prepaid card which is inconvenient and time consuming.

In view of the foregoing, it is an objective of the present invention to provide a convenient method that permits prepaid subscriber credit information to be accessible by any compatible wireless network to permit prepaid roaming.

SUMMARY OF THE INVENTION

Briefly described, and in accordance with the embodiment thereof, the invention discloses a method of prepaying for access to a wireless telecommunication network by storing updated subscriber credit information within the mobile terminal, which is subsequently available for use by other networks. In an embodiment of the present invention, the method includes registering for service with a wireless network by, for example, switching on a mobile terminal. During registration, the subscriber credit information previously stored within the mobile terminal is transmitted to a prepayment node operating in association with the wireless network. The subscriber credit information, which may include a prepaid credit balance in dollars, is transmitted via the Over-the-Air-Teleservice (OATS) function as specified in the IS-136 standard. When a call is placed, for example, the cost of the call, based on the current tariff rate, is calculated by the prepayment node and deducted from the received prepaid credit balance to determine an updated credit balance. The updated credit balance is transmitted via OATS to the mobile terminal for storage therein. The newly stored updated credit balance in the mobile terminal is then accessible by any network that has the capability of accessing the credit information.

The present invention contemplates a method for subscribers to utilize prepaid wireless services that allows them to roam to other compatible networks without the need for a connection to the prepayment node of the subscriber's home provider. Furthermore, the invention only requires minimal modification to existing networks and equipment in a technique that is efficient and transparent to the subscriber. These and other advantages of the present invention will become apparent upon reading the following detailed descriptions and studying the various figures of the drawings.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE PREFERRED EMBODIMENTS

In a basic cellular telecommunication system, a mobile switching center (MSC) is linked to a plurality of base stations by a series of digital transmission links. The base stations are geographically dispersed to form an area of coverage for the system. Each base station (BS) is designated to cover a specified area, known as a cell, in which two way radio communication can take place between a mobile terminal (MT) and the BS in the associated cell. A description of a prepayment system utilizing a transport mechanism for subscriber credit information operating in accordance with the present invention follows.

Figure 1:
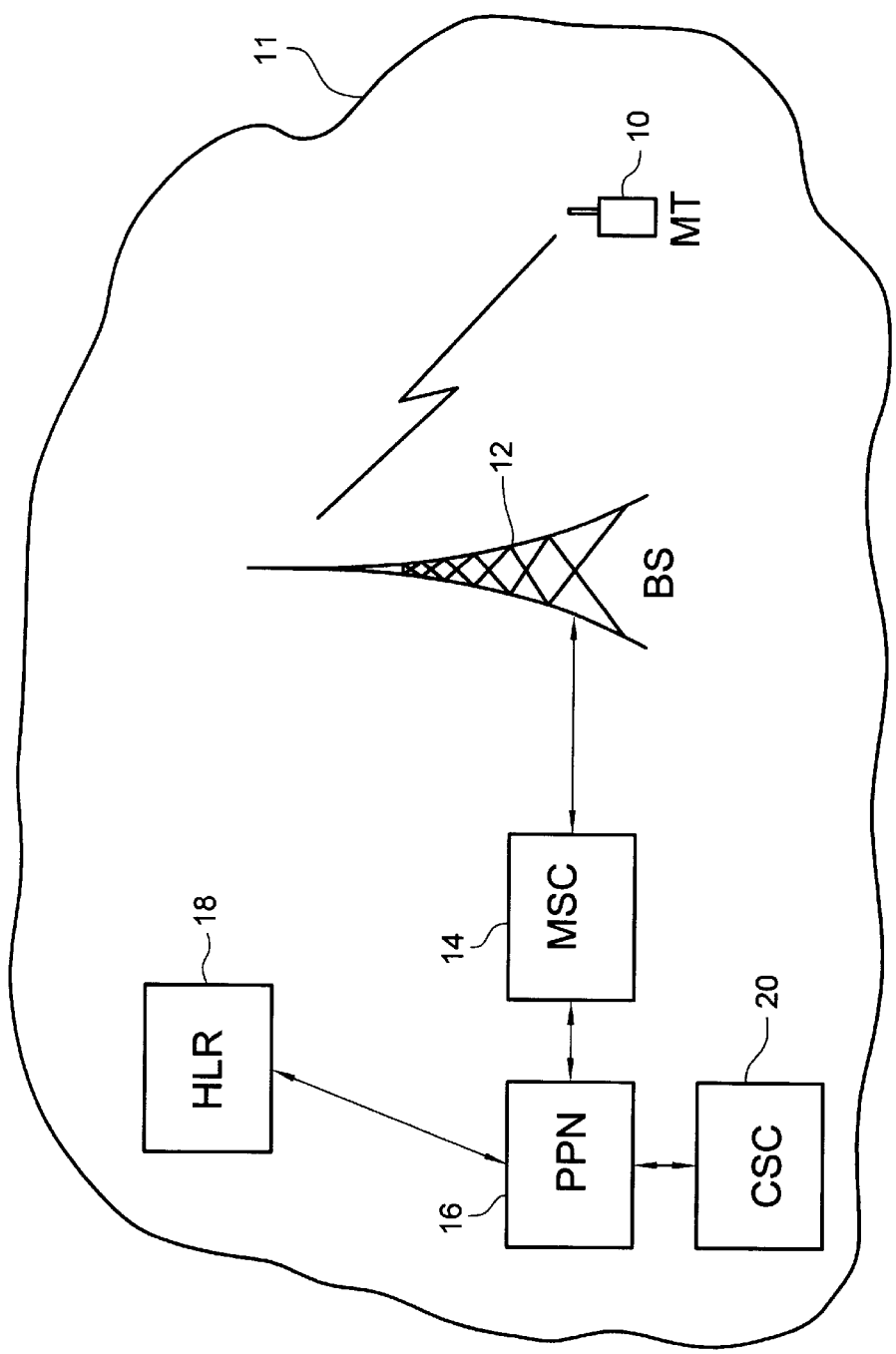
FIG. 1 shows an exemplary wireless network attached to a prepayment system operating in accordance with an embodiment of the present invention.

FIG. 1 shows an exemplary wireless network attached to a prepayment system operating in accordance with an embodiment of the present invention. The network is depicted in simplified form by showing only a single base station and an associated cell. The network comprises an mobile subscriber represented by MT 10 which is in wireless communication with BS 12. The MT 10 may be operating within a service area 11 that may be a home service area for the subscriber or a visiting service area when roaming for example. The BS 12 is typically coupled to MSC 14 by a digital pulse code modulation (PCM) link capable of efficiently delivering digital data over vast distances. Also coupled to MSC 14 is a prepayment node 16 (PPN) to provide prepayment functionality to the network. The PPN 16 is linked to a home location register 18 (HLR) which contains relevant information and profiles of subscribers to the network. The PPN 16 utilizes information from the HLR 18 in order to calculate the appropriate billing data for the subscriber.

The exemplary embodiment depicts a wireless network operating in accordance with the enhanced Digital Advanced Mobile Phone System (D-AMPS) as specified in TIA IS-136 Rev A. Those skilled in the art are appreciative of the fact that the IS-136 Rev A standard supports enhanced functions associated with teleservice transport mechanisms such as Over-the-Air-Teleservice (OATS) functions such as short message service (SMS). Another important type of OATS function is Over-the-Air-Activation (OAA) which supports the procedures necessary to activate new subscribers service over the air without the need to manually program each MT. Typically this is accomplished by the subscriber initially entering a feature code and pressing SEND. The feature code entry results in the establishment of a voice call to the service provider's customer service center 20 (CSC) which in turn exchanges the necessary information with the MT and initiates the procedures needed to establish an account such as billing information, credit worthiness, and to set up service options. This process is also referred to as Subscriber Activation and results in a new subscriber record being created in the HLR via the CSC-HLR interface.

Some OATS teleservice messages such as those associated with OAA differ from those associated with SMS in that they may include active commands that initiate the MT to perform an activity instead of, as in SMS, merely displaying text messages. As those skilled in the art can appreciate, the transport path of OAA messages is otherwise identical to that for SMS. Thus for networks having OATS capability, the OATS mechanism provides an inherently efficient means for exchanging information in which to implement with prepayment applications that store credit information within the MT. In an illustration of the process, the subscriber can subscribe to the prepayment service by entering a feature code which causes automatic programming of MT 10 for prepayment services by the PPN system 16. Once the service is active and the appropriate prepayment credit has been established with the service provider, PPN 16 utilizes the OATS mechanism to program into the terminal with, for example, the subscriber's credit balance in dollars and an optional PIN code. Initially, credit may be established with the service provider by the subscriber using convenient means such as keying in a credit card number or transferring money from a bank account, for example. The credit information is stored in an existing programmable memory in the mobile terminal that is used for storing status parameters needed for operation. For example, stored information may include information on roaming partners, preferred systems, and system parameters, in addition to personal information such as credit card, calling card etc.

Figure 2:
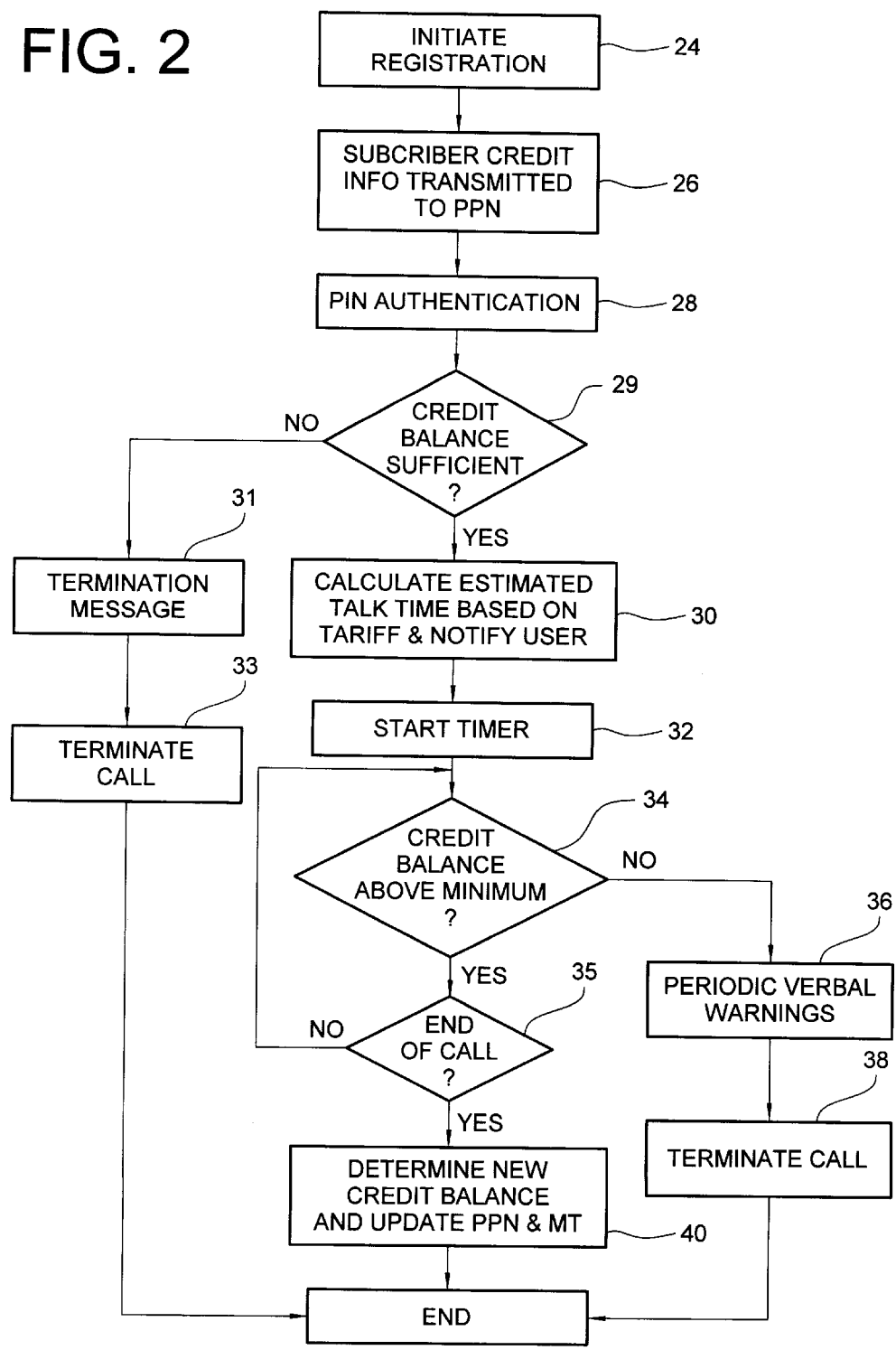
FIG. 2 depicts a flow diagram illustrating the process steps for the prepayment system operating in accordance with the embodiment.

FIG. 2 depicts a flow diagram of a typical prepayment procedure operating in accordance with the embodiment of the present invention. In step 24, the subscriber switches on his/her mobile terminal to initiate registration with a service provider having prepaid service capability. The service provider may be the subscriber's home service provider or, in the case of roaming, a visiting service provider having compatible prepayment service capability. Upon registration the subscriber's credit information i.e. prepaid credit balance in dollars and PIN code stored in MT 10 are transmitted at step 26 to the PPN 16 (FIG. 1) of the wireless network via the OATS transport mechanism. In order to verify that the end-user is the authorized subscriber, a authentication procedure is performed in step 28 wherein the user may be prompted to enter a PIN code which is transmitted to PPN 16 to be compared with the PIN initially received. When the PIN is authenticated, the subscriber is permitted to make and receive calls within the confines of their available credit.

In step 29, the credit balance is verified for sufficient funds prior to making a call in order to proceed. For example, the balance must be in excess of that required for at least 2 minutes of talk time or any minimum time period set by the service provider. If the credit balance is insufficient the subscriber is notified via a voice message (step 31), for example, and the call is terminated (step 33). When the balance is determined to be sufficient the process proceeds to step 30 where the PPN 16 calculates an initial estimation of time remaining the subscriber may engage in conversation based on the credit balance and current tariff plan e.g. tariff at time of day, long distance charge etc. The estimated talk time is then relayed to the subscriber through a voice prompt in step 30. Furthermore, an alternative notification technique would be to send an SMS message to the mobile terminal for display to the subscriber. In step 32, a call duration timer is started to monitor the length of the call and the elapsed time in relation to the remaining credit for billing in real time.

At step 34, a verification is performed to determine if the progressively decreasing credit is above a minimum preset value set by the provider. If the credit is okay, the call continues to step 35. If not, periodic warnings (step 36), e.g. verbal, are initiated to notify the subscriber e.g. every 10 seconds until the credit decreases to zero thus causing the call to be forcibly terminated in step 38. For the situation where the credit is okay and the caller hangs up for a regular termination, the PPN 16 in step 40 calculates the cost of the call and determines a new credit balance i.e. the amount of credit the subscriber has left. The new credit information is then updated within the prepayment system and transmitted to MT 10 to be stored therein using the OATS transport mechanism. The visited network may be reimbursed for credit used by a roaming subscriber by, for example, a third party clearing house or through the previously established roaming agreements with the subscriber's home network.

The present invention contemplates a prepayment system that permits prepaid roaming by subscribers to other compatible networks without the need for connection to the prepayment node of the subscriber's home provider. By storing updated subscriber credit information within the mobile terminal, networks, both home and visited, can dynamically update subscriber credit in a way that is convenient, efficient and transparent to the user. Furthermore, the invention requires minimal modification to networks operating in accordance with IS-136 standard that currently have the capability for OATS functionality. In addition to paying for phone calls, an alternative use of the stored prepaid credit in the mobile terminals may be for a convenient method of payment for various unrelated services. By way of example, charges or fees may be automatically deducted from the prepaid credit when crossing toll gates along highways. Any number of payment applications may be adapted to utilize and take advantage of the credit carrying capabilities herein described.

It should be understood that the embodiment shown herein is merely exemplary and that one skilled in the art can make variations and modifications to the process steps without departing from the spirit and scope of the invention. Furthermore, the inventive concept of subscriber credit portability by storing updated credit information within mobile terminals may be applied to wireless networks operating in accordance with standards other than IS-136. All such variations and modifications are intended to be included within the scope of the invention as defined by the appended claims.

What is claimed is:

1. A method of prepaying for access to a wireless telecommunication network by a mobile subscriber comprising the steps of:

initiating registration for service with a wireless telecommunication network by a mobile terminal associated with said mobile subscriber;

transmitting prepaid subscriber credit information stored within said mobile terminal to a prepayment node associated with said wireless telecommunication network;

calculating the cost of a call made by said mobile subscriber by the prepayment node;

updating, in said prepayment node, said prepaid subscriber credit information by subtracting the cost of said call to determine a new credit balance; and transmitting said new credit balance to said mobile terminal for storage therein.

2. A method according to claim 1 wherein said initiating registration step proceeds in accordance with registration procedures defined in the IS-136 Digital Advanced Mobile Phone System (D-AMPS) standard.

3. A method according to claim 1 wherein said transmitting subscriber credit information step proceeds in accordance with Over-the-Air-Teleservice functionality as specified in the IS-136 standard.

4. A method according to claim 1 wherein said transmitted subscriber credit information further includes a PIN number.

5. A method according to claim 1 wherein said transmitting new credit balance step proceeds in accordance with Over-the-Air-Teleservice functionality as specified in the IS-136 standard.

6. A method according to claim 1 wherein said new credit balance stored within said mobile terminal is accessible by a second wireless telecommunication network compatible with the transmission mechanism operated by the first wireless telecommunication network.

7. A method according to claim 6 wherein the second wireless telecommunication network is a visiting network being accessed by a roaming subscriber.

8. A method according to claim 1 wherein the prepaid credit information stored in the mobile terminal is accessed and utilized as payment for various services rendered.

9. A prepayment system for accessing services from a wireless telecommunication network, wherein said network includes a mobile switching center, a base station, and a home location register, said prepayment system comprising:

a mobile terminal capable of storing subscriber credit information therein;

a prepayment node coupled to and in communication with said mobile switching center and said home location register;

means for transmitting said subscriber credit information from said mobile terminal to said prepayment node; and means for updating subscriber credit information as a result of a call by said prepayment node and transmitting said updated credit information for storage within said mobile terminal.

10. A prepayment system according to claim 9 wherein said means for transmitting said subscriber credit information operates in accordance with Over-the-Air-Teleservice (OATS) functionality as specified in the IS-136 standard.

11. A prepayment system according to claim 9 wherein said subscriber credit information includes a prepaid credit balance.

12. A prepayment system according to claim 9 wherein said subscriber credit information further includes a PIN number.

13. A prepayment system according to claim 9 wherein said subscriber credit information is stored in an erasable programmable memory in said mobile terminal.

14. A prepayment system according to claim 9 wherein said subscriber credit information is accessible by a plurality of compatible wireless networks thereby permitting the subscriber to roam using prepaid credit.

15. A prepayment system according to claim 9 wherein said subscriber credit information is accessible by a plurality of establishments as payment for services rendered.

* * * * *